United States Patent
Ladva et al.

(10) Patent No.: US 7,971,644 B2
(45) Date of Patent: Jul. 5, 2011

(54) FLUID LOSS ADDITIVE AND BREAKING AGENT

(75) Inventors: Hemant K. Ladva, Missouri City, TX (US); Syed Ali, Sugar Land, TX (US); Mohan K. R. Panga, Stafford, TX (US); Richard D. Hutchins, Sugar Land, TX (US); Don Williamson, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 292 days.

(21) Appl. No.: 12/356,276

(22) Filed: Jan. 20, 2009

(65) Prior Publication Data
US 2010/0181065 A1    Jul. 22, 2010

(51) Int. Cl.
*E21B 43/267* (2006.01)
(52) U.S. Cl. ............ 166/283; 166/280.1; 166/308.2; 166/177.5; 507/230
(58) Field of Classification Search .......... 166/283, 166/280.2, 308.1–308.3, 177.5; 507/230, 507/267; 516/31, 77
See application file for complete search history.

(56) References Cited

U.S. PATENT DOCUMENTS

| | | | |
|---|---|---|---|
| 3,998,272 A | 12/1976 | Maly | |
| 4,919,209 A * | 4/1990 | King | 166/300 |
| 7,172,022 B2 | 2/2007 | Reddy et al. | |
| 7,195,068 B2 | 3/2007 | Todd et al. | |
| 7,398,829 B2 | 7/2008 | Hutchins et al. | |
| 7,413,017 B2 | 8/2008 | Nguyen et al. | |
| 2006/0113077 A1 | 6/2006 | Willberg et al. | |
| 2007/0100029 A1 | 5/2007 | Reddy et al. | |
| 2008/0026958 A1 | 1/2008 | Todd et al. | |
| 2008/0035341 A1 | 2/2008 | Saini et al. | |
| 2008/0035342 A1 | 2/2008 | Saini et al. | |

FOREIGN PATENT DOCUMENTS

| | | |
|---|---|---|
| EP | 1326003 | 5/2009 |
| FR | 2704219 | 10/1994 |
| WO | 2007/005499 A1 | 1/2007 |

* cited by examiner

*Primary Examiner* — David J Bagnell
*Assistant Examiner* — Catherine Loikith
(74) *Attorney, Agent, or Firm* — Rachel Greene; David Cate; Jeff Griffin

(57) ABSTRACT

A system includes a hydraulic fracturing fluid including a polymeric constituent and an additive having particles including poly-vinyl acetate in an amount sufficient to control fluid loss. The system includes a formation of interest having a downhole temperature, and the particles including poly-vinyl acetate have a size and/or shape such that the poly-vinyl acetate hydrolyses at the downhole temperature. The particles may have a size and/or shape such that the particles are deformable at the downhole temperature. The poly-vinyl acetate in the particles may be a part of the particle substrate, a coating on the particles, and/or the entire particle may be poly-vinyl acetate. The poly-vinyl acetate may be included in any portion of the hydraulic fracturing fluid, or only the portion of the hydraulic fracturing fluid that is not proppant laden.

23 Claims, 5 Drawing Sheets

FLUID LOSS ADDITIVE AND BREAKING AGENT

FIELD OF THE INVENTION

The present invention relates to fluid-loss control and breaking agents, and more particularly but not exclusively relates to fluid-loss control in hydraulic fracturing operations.

BACKGROUND

The statements in this section merely provide background information related to the present disclosure and may not constitute prior art.

Hydraulic fracturing is a well known technique for improving the producibility and/or injectibility of a well. Hydraulic fracturing fluids can be expensive, can damage the permeability of the subterranean formations connected to the well, and can create disposal problems when they are flowed back to the surface after a fracture treatment. During a fracture treatment, some of the hydraulic fracture fluid may leak off into the formation through the fracture face through the natural permeability of the formation and through natural fractures in the formation. Fluid-loss materials may be added to the hydraulic fracturing fluid to reduce this fluid loss to the formation, but such materials can themselves damage the formation permeability at the fracture face or by invasion into the formation itself. Further, fluid loss materials can further damage the proppant pack permeability in the hydraulic fracture. Accordingly, there is a need for further improvements in this area of technology.

SUMMARY

One embodiment is a unique method for controlling fluid loss and breaking fracture fluids in hydraulic fracture operations. Further embodiments, forms, objects, features, advantages, aspects, and benefits shall become apparent from the following description and drawings.

DESCRIPTION OF THE ILLUSTRATIVE EMBODIMENTS

Figure 1:
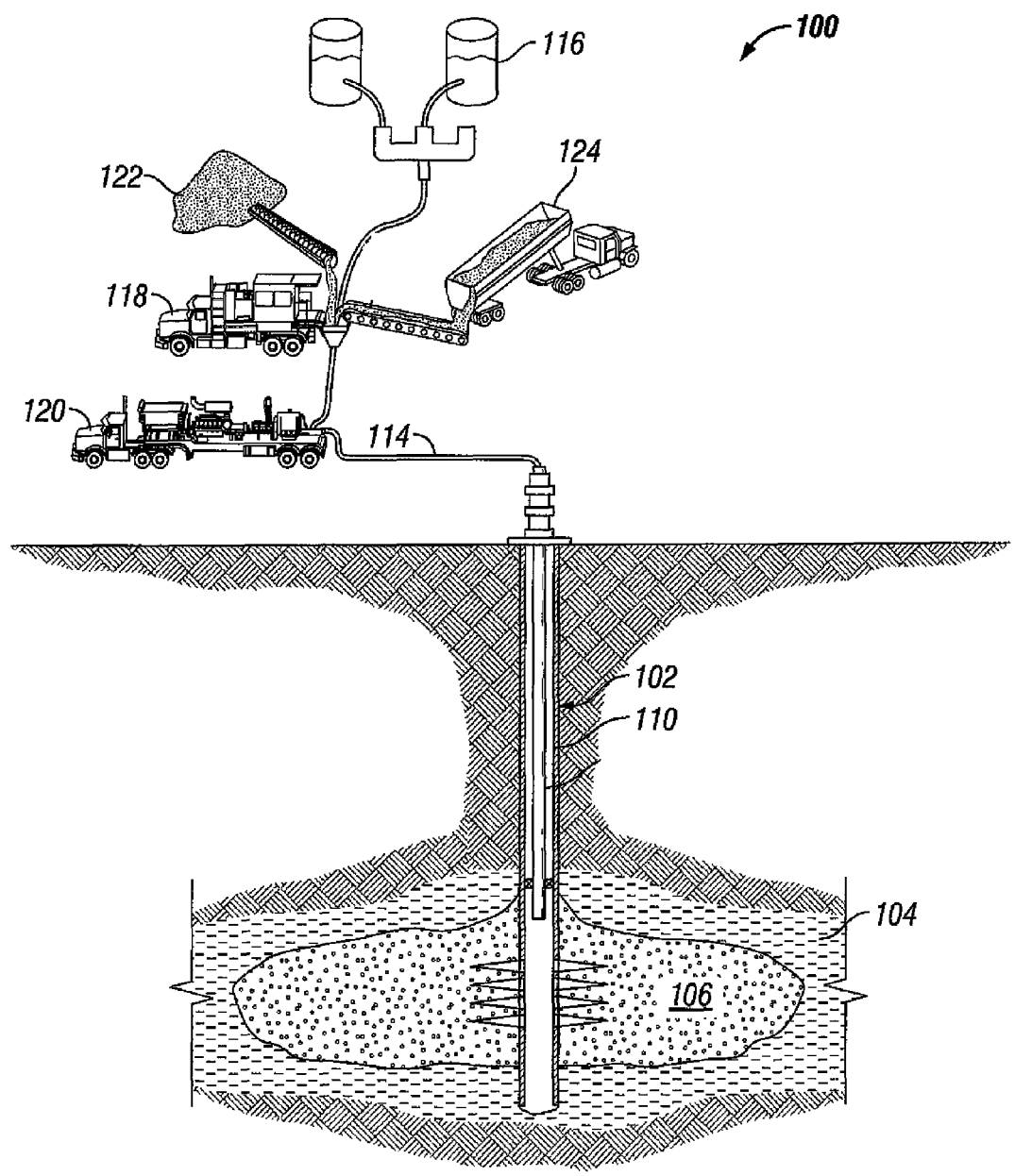
FIG. 1 is a schematic diagram of a system for enhancing fluid loss and breaking properties of a hydraulic fracturing fluid.

For the purposes of promoting an understanding of the principles of the invention, reference will now be made to the embodiments illustrated in the drawings and specific language will be used to describe the same. At the outset, it should be noted that in the development of any such actual embodiment, numerous implementation—specific decisions must be made to achieve the developer's specific goals, such as compliance with system related and business related constraints, which will vary from one implementation to another. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated and protected. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

FIG. 1 is a schematic block diagram of a system 100 for enhancing fluid loss and breaking properties of a hydraulic fracturing fluid. The system 100 includes a hydraulic fracturing fluid 114 having a polymeric constituent. The polymeric constituent includes any known fracturing fluid polymers in the industry, including without limitation guar-based fluids, xanthan, diutan, any other polysaccharides, celluloses, polyacrylamide and/or other synthetic polymers. While the system is described with a polymeric based fracturing fluid, other fracturing fluids that experience a viscosity reduction in the presence of acetic acid and/or poly-vinyl alcohol (products of hydrolysis), or that otherwise have damage characteristics that reduce in the presence of the products of hydrolysis, are also contemplated herein, including surfactant based systems that experience altered micelle structures in the presence of an acetic acid induced pH reduction and/or in the presence of the surface active agent poly-vinyl alcohol.

The system 100 further includes an additive having particles 122 including an ester derivative(s) of poly-vinyl alcohol in an amount sufficient to control fluid loss. Poly-vinyl acetate is an exemplary ester derivative of poly-vinyl alcohol and is used throughout to simplify explanations and enhance clarity of the descriptions. However, the descriptions including poly-vinyl acetate are not intended to be limiting except as provided explicitly herein. Poly-vinyl acetate may be included as poly-vinyl acetate or as a co-polymer of poly-vinyl acetate. The amount of particles 122 sufficient to control fluid loss depends upon the size and/or shape of the particles 122, the size distribution of the particles 122, and the characteristics of the formation 104 of interest. Further, where the particles 122 are deformable downhole, the fluid loss control capability of the particles 122 is enhanced. In some embodiments, particles 122 are included above 1% by weight of the fracturing fluid 114, or in an amount between about 1.0% and 3.0% by weight of the fracturing fluid 114.

Amounts lower than about 1% by weight are effective in certain formations dependent on the characteristics of the formation. Further, in certain embodiments, the poly-vinyl acetate may be included as a coating on the particles 122 and may be present in the hydraulic fracturing fluid in an amount lower than 1% by weight. In one example, the particles 122 are coated with poly-vinyl acetate and include an acid precursor within the particle, where the acid pre-cursor may be poly-lactic acid, poly-glycolic acid, combinations or mixtures thereof, and/or other acid precursors. The amount of poly-vinyl acetate may be as low as about 0.1% by weight of the fracturing fluid or even lower in certain systems.

Amounts greater than about 3% are also contemplated herein for certain formations 104, for example formations where high fluid loss is expected and/or for fracture treatments where large amounts of generated acetic acid and/or poly-vinyl alcohol are desirable. In some embodiments, for example with high permeability or naturally fractured formations, amounts up to about 10% or even greater may be included. The ether derivative of poly-vinyl alcohol, including poly-vinyl alcohol, may be included in an emulsion in the hydraulic fracturing fluid, and either in the internal phase, in the external phase, or even both phases.

The system 100 further includes the particles 122 having a size and/or shape such that at least a portion of the poly-vinyl acetate hydrolysis at an effective functional rate at the downhole temperature. The size and/or shape of the particles 122 affects the hydrolysis rate of the particles 122. For example spherical particles have a maximal volume to surface area ratio, and therefore have a slowest hydrolysis rate for a given particle size, while more eccentric particles such as fibers, flakes, irregular shapes and ellipsoids have lower volume to surface area ratios. Higher volume generally increases the hydrolysis time of the particles 122. The particles 122 may include several shapes in a given embodiment, where the mixed shapes assist in improved fluid loss control and/or provide for hydrolysis over a range of time. In some embodiments, shapes such as fibers are included to provide bridging capabilities in formations having natural fractures or other features where bridging is desirable. All sizes and shapes described herein are exemplary only, and are not intended to be limiting. All descriptions of reasons for including certain sizes and shapes are exemplary only, and not intended to be limiting. The specific features of a given formation, and the specific economics or other features of a given application, determine the ranges of sizes and shapes that may be utilized for a given system.

The molecular weight of the poly-vinyl acetate affects the hydrolysis time. In some embodiments, the poly-vinyl acetate includes an average molecular weight below about 500,000. Higher molecular weights are contemplated herein, for example in high temperature formations 104, or in systems where a long hydrolysis time is desirable, the molecular weights may be higher. In certain embodiments, the particles 122 include a coating of poly-vinyl acetate, and may further include a conventional breaker within the coating. The particles 122 may be of a size and/or shape such that the particles are deformable at the downhole temperature. The downhole temperature used herein describes the temperature experienced by the particles 122 within the formation 104 and hydraulic fracture 106, which may be affected by the temperature and amount of treatment fluid 114 injected, the time over which the injection occurs, and the temperature of the formation 104. The temperature experienced by the particles 122 may also be affected by the penetration of treatment fluid 114 and particles 122 into the formation face 104, and the amount of fluid loss experienced during the fracture treatment.

The particles 122 may have a coating and/or an encapsulation agent that is not poly-vinyl acetate. In certain embodiments, the particles 122 include a conventional breaker, an alkaline buffer, an alcohol, acetate ions, a breaking aid, and/or calcium carbonate. Alkaline materials enhance the rate of hydrolysis of the poly-vinyl acetate but limit the availability of produced acetic acid for breaking the fracturing fluid crosslinks or polymeric backbone. The hydrolysis of poly-vinyl acetate is a reversible reaction, and alcohols and acetate ions therefore affect the hydrolysis rate by changing the dynamic equilibrium. Some of the available control parameters herein include the use of coatings, encapsulation, particle sizes and size distributions, particle shapes and shape distributions, the addition of breakers, breaker aids, alcohol, acetate ions, and alkaline materials to tune a desired hydrolysis rate for a given embodiment based upon the downhole temperature and composition of fluids in the formation 104. Certain of the potential control parameters may be fixed—for example a manufacturing process may require roughly spherical particles, or challenging fluid loss conditions may dictate particle 122 sizes. It is a mechanical step for one of skill in the art to tune the hydrolysis rate and fluid loss characteristics of the treatment fluid 114 for a given embodiment based upon parameters that are typically known about the formation 104 and based upon the disclosures herein.

The hydraulic fracture treatment may include a plurality of fracture stages, for example a pad stage not having proppant, one or more proppant stages, and a flush stage. In certain embodiments, the particles 122 are added to any or all stages of the fracture treatment, and in certain embodiments, the particles 122 are only added to stages that do not include proppant, for example just the pad stage. The particles may include a characteristic size between one micron and 5,000 microns, although in certain embodiments larger particles may be utilized. The characteristic size may be any dimension of the particles considered descriptive of the particle size. Non-limiting examples include a diameter for spherical particles, or a long axis diameter for ellipsoid particles.

The system 100 may further include various equipment for performing a hydraulic fracture treatment and creating the hydraulic fracture 106. Various equipment may include fluid tanks 116 for holding a base fluid, a proppant delivery vehicle 124, a blender 118 that prepares the hydraulic fracturing fluid 114 including the particles 122, and one or more high pressure pumps 120. The wellbore 102 may be any type of completion including casing 110, or open-hole (not shown) in one or more portions. The wellbore 102 may be vertical, deviated, or horizontal. The hydraulic fracture treatment may be any type of treatment, including at least a fracture in conjunction with a gravel packing procedure.

Figure 3:
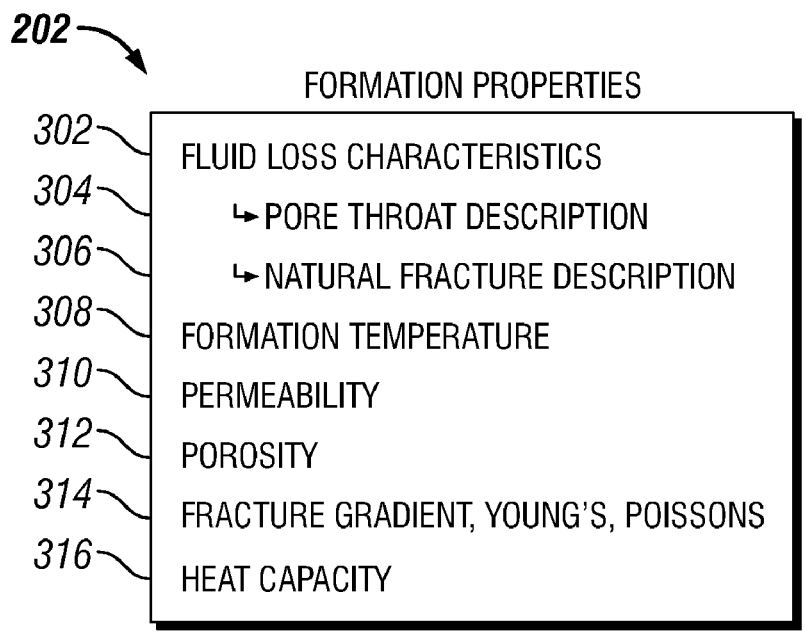
FIG. 3 is an illustration of formation properties.

In certain embodiments, the system 100 includes a means for providing downhole conditions such that the amount of poly-vinyl acetate comprises deformable particles. The means for providing downhole conditions such that particles are deformable include selecting pumping injection rates, particle sizes, particle shapes, fracturing fluid amounts, wellbore shut-in times, fracturing fluid temperatures, particle coatings, and particle compositions such that at the conditions experienced downhole during the fracturing treatment the particles are deformable. Further various operations described in relation to FIGS. 3, 5, and 6 include means for providing downhole conditions such that particles are deformable.

In certain embodiments, the system 100 includes a means for providing downhole conditions such that the amount of poly-vinyl acetate comprises degradable particles. The overall composition of the particles 122 may be controlled such that the particles 122 degrade completely, and/or degrade into small enough particles to flow out of the hydraulic fracture after the completion of the hydraulic fracturing treatment.

In certain embodiments, the system 100 includes a means for providing downhole conditions such that the poly-vinyl acetate hydrolyses within a desired time window. The means for providing downhole conditions such that the poly-vinyl acetate hydrolyses within a desired time window include selecting pumping injection rates, particle sizes, particle shapes, fracturing fluid amounts, wellbore shut-in times, fracturing fluid temperatures, particle coatings, hydrolysis enhancers, poly-vinyl acetate molecular weights, and particle compositions such that, at the conditions experienced downhole during and/or after the fracturing treatment, at least a portion of the poly-vinyl acetate hydrolyses within the desired time window. Further various operations described in relation to FIGS. 3, 5, and 6 include means for providing downhole conditions such that the poly-vinyl acetate hydrolyses within a desired time window.

Figure 2:
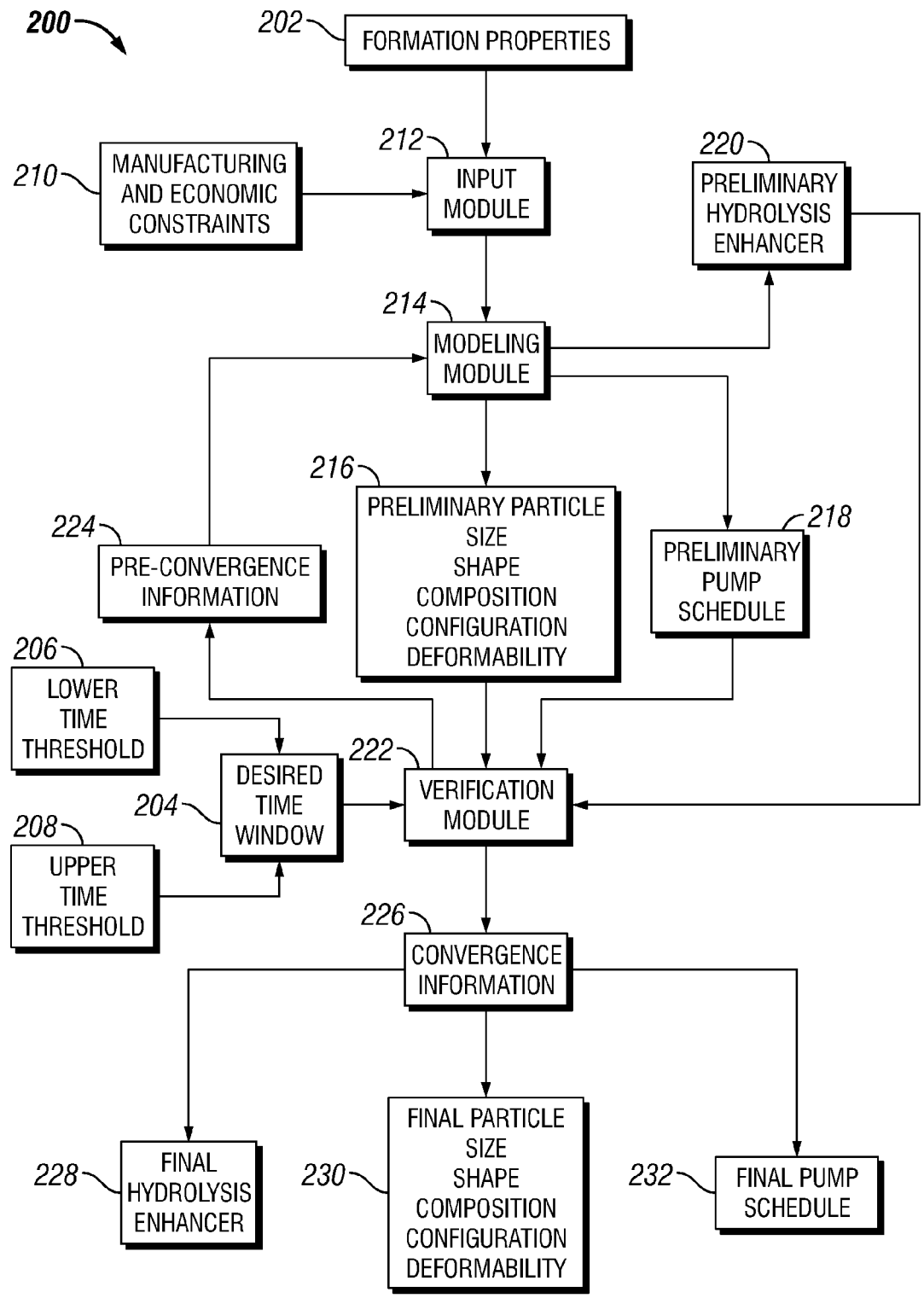
FIG. 2 is a schematic data flow illustration for enhancing fluid loss and breaking properties of a hydraulic fracturing fluid.

FIG. 2 is a schematic data flow illustration 200 for enhancing fluid loss and breaking properties of a hydraulic fracturing fluid. The data flow illustration 200 illustrates various elements of data utilized in certain embodiments of the present invention. The data elements illustrated are non-limiting, and may be omitted or substituted in certain embodiments. The data flow illustration 200 describes certain functional elements as modules to emphasize the functional independence of these features. Modules may be implemented in hardware, software, or as operations performed by individuals. Further, the functions described in relation to certain modules may be combined, omitted, divided, or substituted in certain embodiments.

The data flow illustration 200 includes an input module 212 that interprets formation properties 202 and manufacturing and economic constraints 210. The formation properties include various parameters about the formation 104 necessary or useful to designing a fracture treatment. Referencing FIG. 3, the formation properties 202 in one embodiment include fluid loss characteristics 302 such as a pore throat description 304 and a natural fracture description 306. The formation properties 202 in FIG. 3 further include a formation temperature 308, permeability 310, porosity 312, material strength parameters 314 such as a fracture gradient, Young's modulus, and Poisson's ratio, and a heat capacity 316 of the formation and/or formation fluid. Other parameters may be included in the formation properties 202, and parameters illustrated in FIG. 3 may be omitted. The formation properties 202 may be determined by estimation, by mini-frac tests, by logging data including conventional and advanced logs, by core samples, and/or by any other method understood in the art.

Manufacturing and economic constraints 210 include any limiting parameters of any type that define limitations of the system 100 not directly related to the formation 104. Non-limiting examples include the cost, size, and shape descriptions of available particles 122, the available power of fracturing pumps 120, the cost and availability of fracturing fluids, proppants and other additives including conventional breakers, and the cost of heating fluids at the surface. Any parameters that would be understood to one of skill in the art to assist in determining appropriate and economically sound values for fluid loss capability and breaking capability of the fracturing fluid 114 may be included in the manufacturing and economic constraints 210.

The data flow illustration 200 includes a modeling module 214 that predicts an outcome of a fracturing treatment according to preliminary particle characteristics 216, a preliminary pump schedule 218, and a preliminary hydrolysis enhancer 220 design. The preliminary parameters 216, 218, 220 may be determined according to rules of thumb, how fracture treatments are typically performed in an area, according to the use of cheapest or most readily available materials, etc. The results of the treatment design are checked with a verification module 222 that determines whether design convergence has occurred. Design convergence is a determination that design constraints are acceptably met, and may include an absolute comparison (e.g. less than 150,000 gallons of fluid lost to the formation 104) or a relative comparison which may be an optimization (e.g. lowest fluid loss while placing 100,000 pounds of proppant). In certain embodiments, one set of design constraints includes a desired time window 204 in which hydrolysis of the particles 122 should occur. The desired time window 204 may include a lower time threshold 206 and/or an upper time threshold 208.

If the verification module 222 determines that convergence is not achieved, the verification module 222 passes pre-convergence information 224 back to the modeling module 214 for a subsequent adjustment and modeling operation. The pre-convergence information 224 includes information that the modeling module 214 utilizes in a design iteration to adjust the design toward convergence—for example the pre-convergence information 224 may include an error value describing how much and in which direction a constraint was missed. The modeling module 214 adjusts the control parameters, or the values that are adjustable and not constrained, to move the design 216, 218, 220 toward convergence.

If the verification module 222 determines that convergence is achieved, the verification module 222 provides convergence information 226 including a final hydrolysis enhancer 228, final particle characteristics 230, and a final pump schedule 232. The final information 228, 230, 232 may be provided to an output display (not shown), stored on a computer readable storage device (not shown), or may be a value determined by an operator (not shown).

The particle characteristics 216, 230 include any information necessary for the particles 222 to be manufactured or ordered with specificity. Some of the information that may be included in the particle characteristics 216, 230 include particle size, shape, composition, configuration, and deformability. The composition includes how much poly-vinyl acetate polymer or co-polymer is in the particle 122 and the molecular weights of the poly-vinyl acetate, as well as the composition of any of the other material in the particles 122. The particle configuration includes a description of any coating or encapsulation of the particles 122, where the coatings may be poly-vinyl acetate or other materials. The deformability may be a description of the requirements of time and temperature at which the particles 122 should soften to a deformable state, which is tunable with other parameters such as the molecular weight of the poly-vinyl acetate, the presence and material of a coating, and the size and/or shape of the particle. In some embodiments, some of the listed particle characteristics 216, 230 are not utilized, and other parameters may be included in some embodiments.

The hydrolysis enhancer 220, 228 includes anything added to the fracturing fluid 114 to adjust the hydrolysis rate and hydrolysis product availability. For example, an alkaline buffer enhances the hydrolysis rate of poly-vinyl acetate, and an alcohol or acetate ions added to the fracturing fluid 114 adjusts the dynamic equilibrium of the reversible hydrolysis reaction. Higher order carboxylic acid derived ions (e.g. propanoate ion, butanoate ion, etc.) may also be utilized as a hydrolysis enhancer. Hydrolysis enhancers may be additives to the fracturing fluid 114, and/or may be included in the particles 122 or coated on the particles.

The pump schedule 220, 232 is the operational description of the fracturing treatment, including pump rates, stage sizes, proppant amounts (including step or ramp values), and the amounts of additives and particles 122 added throughout the job. Other parameters understood in the art may be described in the pump schedule 220, 232.

Figure 4:
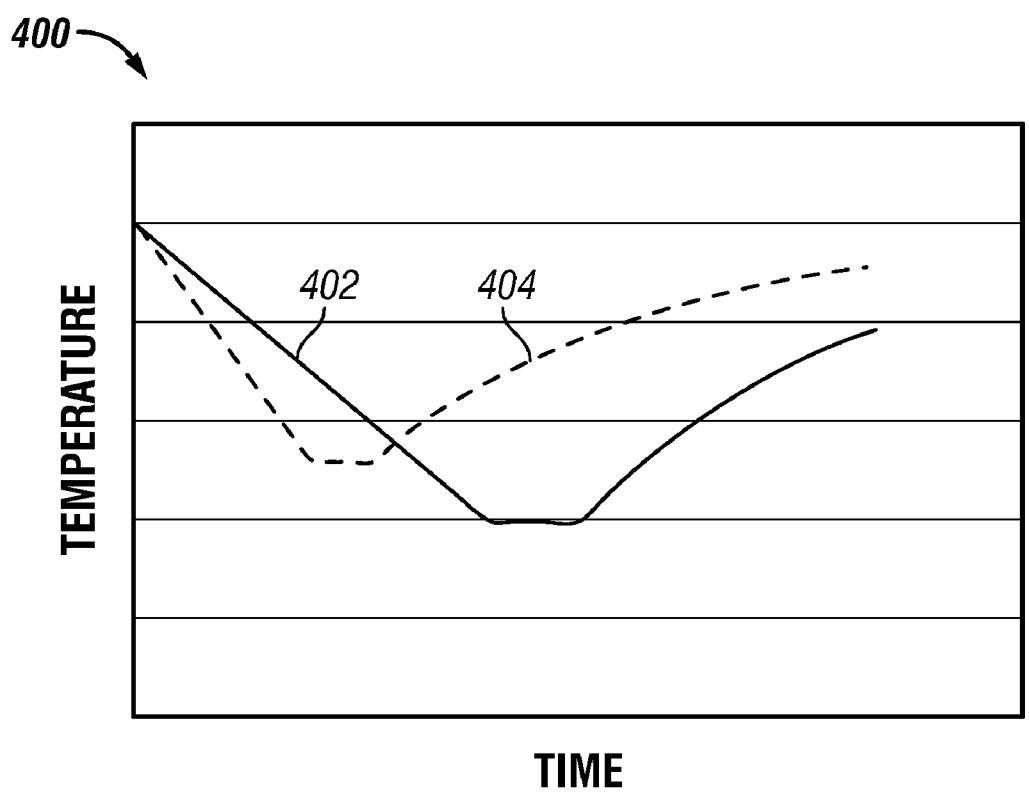
FIG. 4 is an illustration of temperature trajectories of a formation of interest in a hydraulic fracture area for a time period during and after hydraulic fracture treatments.

FIG. 4 is an illustration 400 of temperature trajectories 402, 404 of a formation of interest 104 in a hydraulic fracture area for a time period during and after hydraulic fracture treatments. The first trajectory 402 represents the temperature after a fracture treatment at a relatively low injection rate, where more fracturing fluid overall is injected due to fluid loss and therefore a greater overall cooling of the formation 104 is indicated. The second trajectory 404 represents the temperature after a fracture treatment at a relatively high injection rate, where less fracturing fluid overall is injected and therefore a lower overall cooling of the formation 104 is indicated. Hydrolysis reactions of poly-vinyl acetate are temperature dependent, and the information from temperature trajectories 202, 204 such as illustrated in FIG. 4 may be utilized by the modeling module 214 in certain embodiments to determine an amount and composition of hydrolysis products over time. Other aspects of certain embodiments, including without limitation the degradation of particle coatings, may have temperature dependent aspects and the estimation, measurement, or modeling of downhole temperature over time may be utilized in certain embodiments. The downhole temperature, as used herein, is the temperature where the particles 122 are present, and may be in the hydraulic fracture 106, at the tip of the hydraulic fracture 106, at the formation face within the hydraulic fracture, and/or within the proppant pack of the hydraulic fracture 106. In certain embodiments, such as with a short half-length fracture associated with a gravel packing operation, a downhole temperature in the wellbore 102 may be utilized as a downhole temperature estimate.

Figure 5:
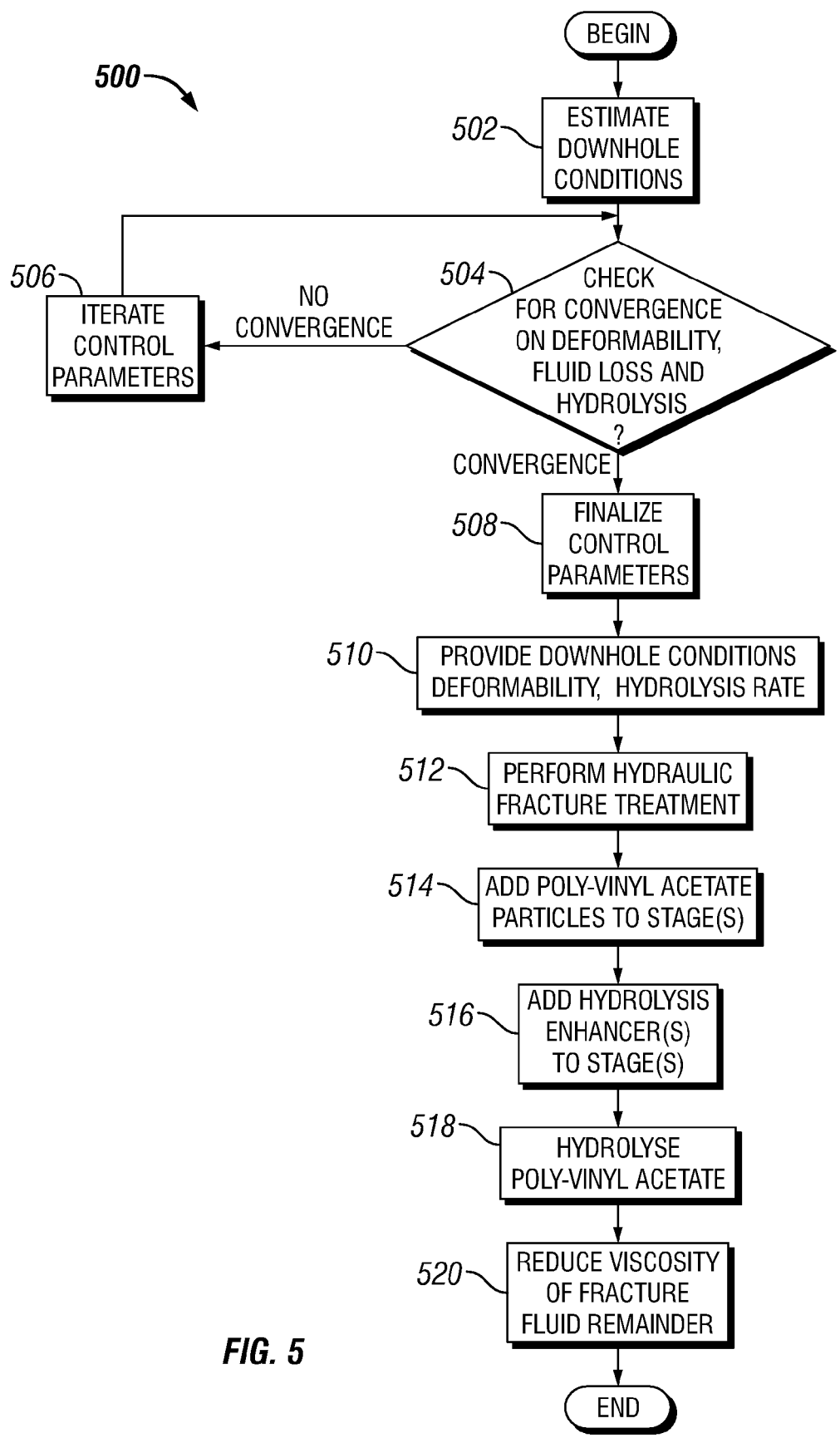
FIG. 5 is a schematic flow diagram of a procedure for enhancing fluid loss and breaking properties of a hydraulic fracturing fluid.
Figure 6:
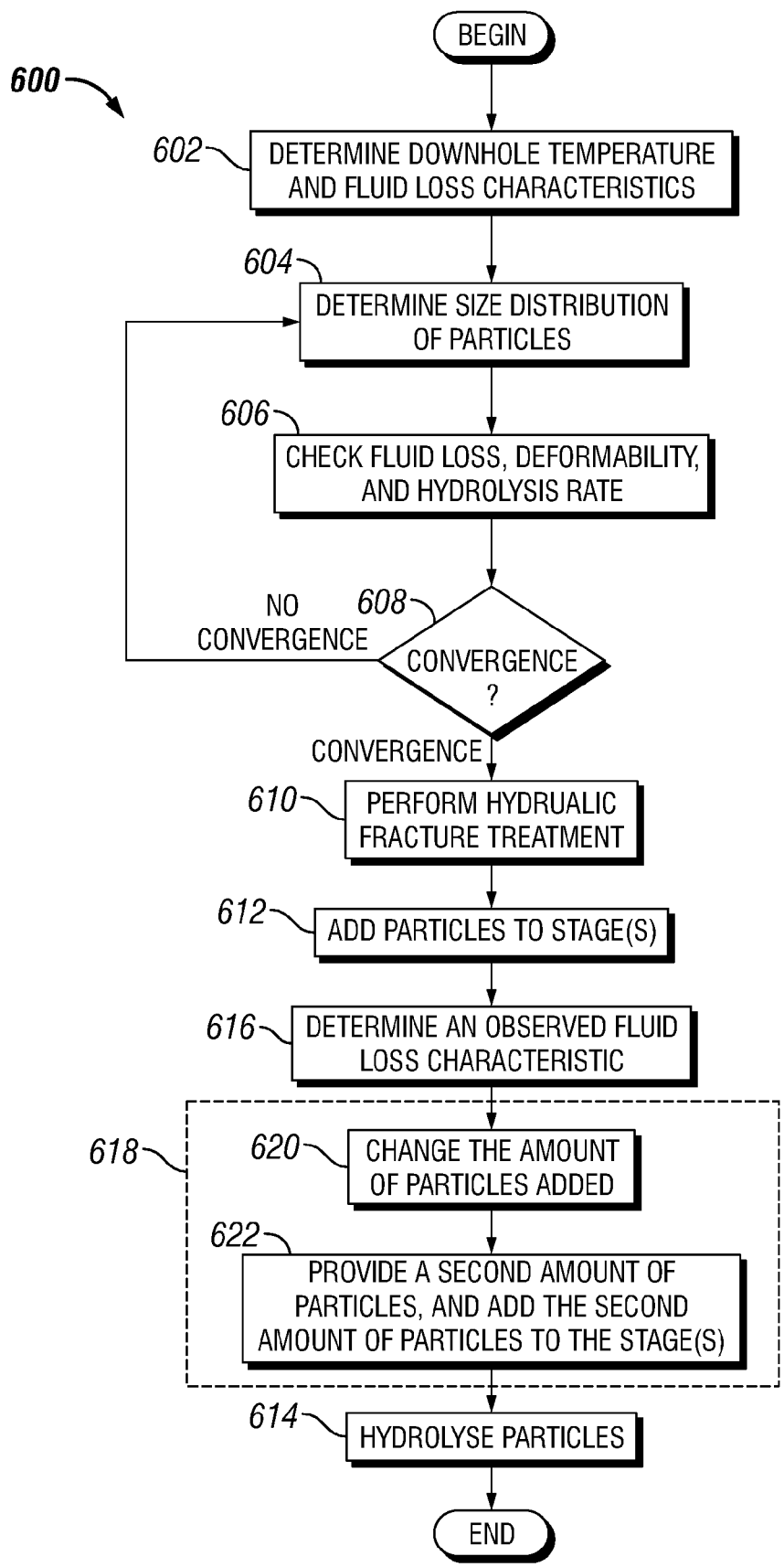
FIG. 6 is a schematic flow diagram of a second procedure for enhancing fluid loss and breaking properties of a hydraulic fracturing fluid.

The schematic flow diagrams in FIGS. 5 and 6, and the related descriptions which follow, provide illustrative embodiments of performing operations for enhancing the fluid loss and breaking properties of a fracturing fluid. Operations illustrated are understood to be exemplary only, and operations may be combined or divided, and added or removed, as well as re-ordered in whole or part, unless stated explicitly to the contrary herein.

FIG. 5 is a schematic flow diagram of a procedure 500 for enhancing fluid loss and breaking properties of a hydraulic fracturing fluid 114. The procedure 500 includes an operation 502 to estimate downhole conditions including formation properties. The procedure 500 further includes an operation 504 to check for convergence on particle deformability and hydrolysis rates, for example by determining whether particle deformability and hydrolysis rates will meet requirements if a preliminary pump schedule is performed utilizing preliminary values for particle characteristics. The procedure 500 further includes an operation 506 to iterate control parameters in response to a determination that no convergence is achieved, and to repeat the operation 504 to check for convergence. The procedure 500 further includes an operation 508 to finalize control parameters including a pump schedule, particle characteristics, and hydrolysis enhancer materials in response to a determination that convergence is achieved. The procedure 500 further includes an operation 510 to provide downhole conditions such that the amount of poly-vinyl acetate includes deformable particles, and/or providing downhole conditions such that the performing hydrolysis occurs within a desired time window.

The procedure 500 includes an operation 512 to perform a hydraulic fracture treatment with a fracturing fluid to create a hydraulic fracture in a formation of interest, and an operation 514 to add particles including poly-vinyl acetate to at least one stage of the hydraulic fracture treatment in an amount effective to control fluid loss. The procedure 500 further includes an operation 516 to add hydrolysis enhancer(s) to one or more stages of the hydraulic fracture treatment. The hydrolysis enhancer, if present, includes an alkaline buffer, an alcohol, acetate ions, and/or carboxylic acid derived ions. Enhancement of the hydrolysis rate indicates changing the rate to a more desirable rate, and may include increasing or decreasing the hydrolysis rate, or changing the time over which the hydrolysis occurs (e.g. the hydrolysis may occur later in time, and more quickly when it occurs). The procedure 500 further includes an operation 518 to perform hydrolysis of at least a portion of the poly-vinyl acetate, and an operation 520 to reduce a viscosity of a fracture fluid remainder in the hydraulic fracture with the hydrolysis products.

FIG. 6 is a schematic flow diagram of a second procedure 600 for enhancing fluid loss and breaking properties of a hydraulic fracturing fluid. The procedure 600 includes an operation 602 to determine a downhole temperature and fluid loss characteristics of a formation of interest, and an operation 604 to determine a size distribution for particles including poly-vinyl acetate in response to the downhole temperature and the fluid loss characteristics. In certain embodiments, determining the downhole temperature further includes determining a temperature trajectory of the formation of interest in the hydraulic fracture area for a time period during and after the hydraulic fracture treatment.

In certain embodiments, the procedure 600 includes determining the size distribution for the particles by an operation 606 to check whether the particles have acceptable deformability, fluid loss, and/or hydrolysis rate characteristics, and an operation 608 to check whether a convergence is achieved. If the operation 608 determines a convergence is not achieved, the procedure 600 repeats the operation 604 to determine the particle size distribution, the operation 606 to determine fluid loss, deformability, and hydrolysis rate characteristics, and the operation 608 to check whether convergence is achieved.

If the operation 608 determines that convergence is achieved the procedure 600 continues with an operation 610 to perform a hydraulic fracture treatment on the formation of interest with a hydraulic fracturing fluid, and an operation 612 to add an amount of particles including poly-vinyl acetate to the hydraulic fracturing fluid during at least one of the stages, where the amount of particles is effective to control fluid loss.

The procedure 600 further includes an operation 616 to determine an observed fluid loss characteristic and an operation 618 to adjust the amount of particles in response to the observed fluid loss characteristic. The observed fluid loss characteristic may be a determination during the fracture treatment that the fluid loss characteristics of the hydraulic fracturing fluid need to be enhanced or reduced. For example, pressure monitoring during the fracture treatment may indicate that fluid leakoff is greater than expected (e.g. if pressure buildup during fracture development is lower than expected). The pressure monitoring may be performed with other techniques to isolate pressure effects from other explanations such as fracture height growth (e.g. through temperature monitoring and/or tiltmeter assessment), although any fluid leakoff determination technique known in the art may be utilized.

The operation 618 to adjust the amount of particles includes an operation 620 to change the amount of particles added, and/or an operation 622 to providing a second amount of particles including poly-vinyl acetate and add the second amount of particles to the hydraulic fracturing fluid. The second amount of particles includes a different size distribution and/or a different shape from the amount of particles. For example, where the fluid leakoff amount is determined to be too high, the amount of particles may be increased, and where the fluid leakoff amount is determined to be lower than expected, the amount of particles may be decreased.

In another example, a second amount of particles having a different shape and/or size distribution from the (first) amount of particles may be provided and added to the hydraulic fracturing fluid in response to the observed fluid loss characteristics. The second amount of particles may be shaped to address anticipated problems—for example fibers or large particles to bridge natural fractures that may be encountered, or they may be shaped to take advantage of presented opportunities—for example smaller or cheaper particles than the first amount of particles to allow for a cheaper hydraulic fracture execution where leakoff is lower than anticipated. All examples are provided for illustration only and are not to be considered limiting. Any adjustments understood by one of skill in the art with the benefit of the disclosures herein are contemplated in the present application.

The procedure 600 further includes an operation 614 to perform hydrolysis of the particles, including the amount of particles and the second amount of particles, thereby reducing a viscosity of a remainder of the hydraulic fracturing fluid.

As is evident from the figures and text presented above, a variety of embodiments according to the present invention are contemplated.

One exemplary embodiment is a method including performing a hydraulic fracture treatment with a fracturing fluid to create a hydraulic fracture in a formation of interest, and adding particles including poly-vinyl acetate to at least one stage of the hydraulic fracture treatment in an amount effective to control fluid loss. The method further includes performing hydrolysis at least a portion of the poly-vinyl acetate, and reducing a viscosity of a fracture fluid remainder in the hydraulic fracture with the hydrolysis products.

The fracturing fluid may be a polymeric fracturing fluid. The amount of poly-vinyl acetate may be at least 1% by weight, and in certain further embodiments the amount of poly-vinyl acetate is an amount between 1.0% and 3.0% by weight, inclusive. In certain further embodiments, the method further includes providing downhole conditions such that the amount of poly-vinyl acetate includes deformable particles, and/or providing downhole conditions such that the performing hydrolysis occurs within a desired time window. The desired time window may include a time between a lower time threshold and an upper time threshold.

In certain further embodiments, the method includes adding a hydrolysis enhancer to the stage(s) of the hydraulic fracture treatment, where the hydrolysis enhancer is: an alkaline buffer, an alcohol, acetate ions, and/or carboxylic acid derived ions. In some embodiments, the amount of poly-vinyl acetate is not added to any of the proppant stages of the hydraulic fracture treatment.

Another exemplary embodiment is a system including a hydraulic fracturing fluid having a polymeric constituent, an additive having particles including poly-vinyl acetate in an amount sufficient to control fluid loss, and a formation of interest having a downhole temperature. The system includes the particles having a size and/or shape such that at least a portion of the poly-vinyl acetate hydrolyses at the downhole temperature.

In certain embodiments, the particles include poly-vinyl acetate as one of poly-vinyl acetate and a copolymer of poly-vinyl acetate. The poly-vinyl acetate may include particles having an average molecular weight below about 500,000. The particles may include a coating of poly-vinyl acetate, and may further include a conventional breaker within the coating. The particles may be of a size and/or shape such that the particles are deformable at the downhole temperature. The particles may have a coating and/or an encapsulation agent that is not poly-vinyl acetate. In certain further embodiments, the particles include a conventional breaker, an alkaline buffer, an alcohol, acetate ions, a breaking aid, and/or calcium carbonate.

Some embodiments of the system include a plurality of fracture stages, where the particles are not included in any of the plurality of fracture stages having a proppant. The particles may include a shape or shapes selected from spheres, beads, fibers, flakes, irregular shapes, and ellipsoids. The particles may include a characteristic size between one micron and 5,000 microns. In certain embodiments, the system includes a means for providing downhole conditions such that the amount of poly-vinyl acetate comprises deformable particles, and/or a means for providing downhole conditions such that the poly-vinyl acetate hydrolyses within a desired time window.

In yet another exemplary embodiment, a method includes determining a downhole temperature and fluid loss characteristics of a formation of interest, determining a size distribution for particles including poly-vinyl acetate in response to the downhole temperature and the fluid loss characteristics, and performing a hydraulic fracture treatment on the formation of interest with a hydraulic fracturing fluid. The hydraulic fracture treatment includes a plurality of stages, and the method further includes adding an amount of particles including poly-vinyl acetate to the hydraulic fracturing fluid during at least one of the stages, where the amount of particles is effective to control fluid loss. The method further includes performing hydrolysis at least a portion of the amount of particles thereby reducing a viscosity of a remainder of the hydraulic fracturing fluid.

In certain embodiments, determining the downhole temperature further includes determining a temperature trajectory of the formation of interest in the hydraulic fracture area for a time period during and after the hydraulic fracture treatment. The determining a size distribution for particles including poly-vinyl acetate in response to the downhole temperature and the fluid loss characteristics may include determining the size distribution such that the particles are deformable at the downhole temperature. The determining a size distribution for particles including poly-vinyl acetate in response to the downhole temperature and the fluid loss characteristics may include determining the size distribution such that fluid loss conduits in the formation of interest are sufficiently blocked to achieve a desired fluid loss rate. In certain further embodiments, the determining a size distribution for particles including poly-vinyl acetate in response to the downhole temperature and the fluid loss characteristics includes determining the size distribution such that the performing hydrolysis occurs within a desired time window. In certain embodiments, the fluid loss characteristics include a pore throat description and/or a natural fracture description.

In one embodiment, the method further includes determining an observed fluid loss characteristic and adjusting the amount of particles in response to the observed fluid loss characteristic. The adjusting includes changing the amount of particles added, and/or providing a second amount of particles including poly-vinyl acetate, and adding the second amount of particles to the hydraulic fracturing fluid during the at least one of the stages. The second amount of particles include at least one of a different size distribution and different shape from the amount of particles.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   performing a hydraulic fracture treatment with a fracturing fluid to create a hydraulic fracture in a formation of interest;
   adding particles comprising an ester derivative of poly-vinyl alcohol to at least one stage of the hydraulic fracture treatment in an amount effective to control fluid loss;
   performing a hydrolysis of at least a portion of the ester derivative of poly-vinyl alcohol; and,
   reducing a viscosity of a fracture fluid remainder in the hydraulic fracture with products of the hydrolysis.

2. The method of claim 1, wherein the ester derivative of poly-vinyl alcohol is included in an emulsion.

3. The method of claim 1, wherein the ester derivative of poly-vinyl alcohol comprises poly-vinyl acetate.

4. The method of claim 1, wherein the amount of the ester derivative of poly-vinyl alcohol comprises an amount greater than 0.1% by weight.

5. The method of claim 4, wherein the amount of the ester derivative of poly-vinyl alcohol comprises a coating on the particles.

6. The method of claim 5, wherein the particles further comprise an acid precursor.

7. The method of claim 4, wherein the amount of the ester derivative of poly-vinyl alcohol comprises an amount between 1.0% and 3.0% by weight, inclusive.

8. The method of claim 1, wherein the amount of the ester derivative of poly-vinyl alcohol comprises an amount less than 10% by weight.

9. The method of claim 1, wherein the amount of the ester derivative of poly-vinyl alcohol comprises at least 1% by weight.

10. The method of claim 1, further comprising providing downhole conditions such that the amount of the ester derivative of poly-vinyl alcohol comprises deformable particles in the hydraulic fracture.

11. The method of claim 1, further comprising providing downhole conditions such that the amount of the ester derivative of poly-vinyl alcohol comprises degradable particles in the hydraulic fracture.

12. The method of claim 1, further comprising providing downhole conditions such that the performing the hydrolysis occurs within a desired time window.

13. The method of claim 12, wherein the desired time window comprises a time between a lower time threshold and an upper time threshold.

14. The method of claim 1, further comprising adding a hydrolysis enhancer to the at least on stage of the hydraulic fracture treatment, wherein the hydrolysis enhancer is selected from the group consisting of: an alkaline buffer, an alcohol, acetate ions, and carboxylic acid derived ions.

15. The method of claim 1, wherein the at least one stage of the hydraulic fracture treatment does not include any of the proppant stages of the hydraulic fracture treatment.

16. A method, comprising:
   determining a downhole temperature and fluid loss characteristics of a formation of interest;
   determining a size distribution for particles including poly-vinyl acetate in response to the downhole temperature and the fluid loss characteristics;
   performing a hydraulic fracture treatment on the formation of interest with a hydraulic fracturing fluid, the hydraulic fracture treatment including a plurality of stages;
   adding an amount of particles including poly-vinyl acetate to the hydraulic fracturing fluid during at least one of the stages, the amount of particles being effective to control fluid loss; and
   performing hydrolysis at least a portion of the amount of particles thereby reducing a viscosity of a remainder of the hydraulic fracturing fluid.

17. The method of claim 16, wherein the determining the downhole temperature comprises determining a temperature trajectory of the formation of interest in the hydraulic fracture area for a time period during and after the hydraulic fracture treatment.

18. The method of claim 16, wherein the determining a size distribution for particles including poly-vinyl acetate in response to the downhole temperature and the fluid loss characteristics comprises determining the size distribution such that the particles are deformable at the downhole temperature.

19. The method of claim 16, wherein the determining a size distribution for particles including poly-vinyl acetate in response to the downhole temperature and the fluid loss characteristics comprises determining the size distribution such that fluid loss conduits in the formation of interest are sufficiently blocked to achieve a desired fluid loss rate.

20. The method of claim 16, wherein the determining a size distribution for particles including poly-vinyl acetate in response to the downhole temperature and the fluid loss characteristics comprises determining the size distribution such that the performing hydrolysis occurs within a desired time window.

21. The method of claim 16, wherein the fluid loss characteristics comprise at least one of a pore throat description and a natural fracture description.

22. The method of claim 16, further comprising determining an observed fluid loss characteristic and adjusting the amount of particles in response to the observed fluid loss characteristic.

23. The method of claim 22, wherein the adjusting the amount of particles comprises at least one adjustment selected from the adjustments consisting of:
   changing the amount of particles added; and providing a second amount of particles including polyvinyl acetate, the second amount of particles having at least one of a different size distribution and different shape from the amount of particles, and adding the second amount of particles to the hydraulic fracturing fluid during the at least one of the stages.

* * * * *